US006781961B1

(12) United States Patent
Gunsay

(10) Patent No.: US 6,781,961 B1
(45) Date of Patent: Aug. 24, 2004

(54) SYSTEMS AND METHODS FOR ROUTING MESSAGES SENT BETWEEN COMPUTER SYSTEMS

(75) Inventor: Metin Gunsay, Draper, UT (US)

(73) Assignee: emWare, Inc., Salt Lake City, UT (US)

(*) Notice: Subject to any disclaimer, the term of this patent is extended or adjusted under 35 U.S.C. 154(b) by 727 days.

(21) Appl. No.: 09/715,408

(22) Filed: Nov. 17, 2000

(51) Int. Cl.$^7$ .............................. H04L 12/28
(52) U.S. Cl. ...................... 370/255; 370/401
(58) Field of Search ................ 370/255, 256, 370/254, 351, 352, 389, 392, 400, 401, 408, 475, 488, 230, 252; 709/223, 224, 225, 220, 228, 232, 238, 245, 252

(56) References Cited

U.S. PATENT DOCUMENTS

| | | | |
|---|---|---|---|
| 5,619,648 A | | 4/1997 | Canale et al. ............... 709/206 |
| 5,734,903 A | | 3/1998 | Saulpaugh et al. ......... 719/316 |
| 5,784,570 A | | 7/1998 | Funkhouser ............... 709/247 |
| 5,882,527 A | | 3/1999 | Rubin et al. ................ 210/769 |
| 5,884,033 A | | 3/1999 | Duvall et al. .............. 709/206 |
| 5,905,863 A | * | 5/1999 | Knowles et al. ............ 709/206 |
| 6,072,942 A | | 6/2000 | Stockwell et al. .......... 709/206 |
| 6,167,438 A | * | 12/2000 | Yates et al. ................. 709/216 |
| 6,484,317 B1 | * | 11/2002 | Wright ........................ 725/32 |
| 6,564,059 B1 | * | 5/2003 | Cyr et al. .................. 455/445 |
| 6,665,278 B2 | * | 12/2003 | Grayson .................... 370/328 |

* cited by examiner

*Primary Examiner*—Brian Nguyen
(74) *Attorney, Agent, or Firm*—Madson & Metcalf

(57) ABSTRACT

A method for routing electronic messages for communications between computer systems may include the steps of examining a plurality of interest data sets, each having a interest value that indicates specific data that is of interest, creating a filter tree from the plurality of interest data sets where each filter of the filter tree accurately describes child filters in such a way that messages may be properly passed to any terminal filters of the tree which have an interest value that describes the messages, examining the messages, comparing the messages to the root filter of the filter tree to determine if the messages should pass the root filter, and, as long as the messages passes a current filter, comparing the messages with the child filters of the current filter in order to effectively pass the messages to any terminal filters of the tree having an interest value that describes the messages.

16 Claims, 12 Drawing Sheets

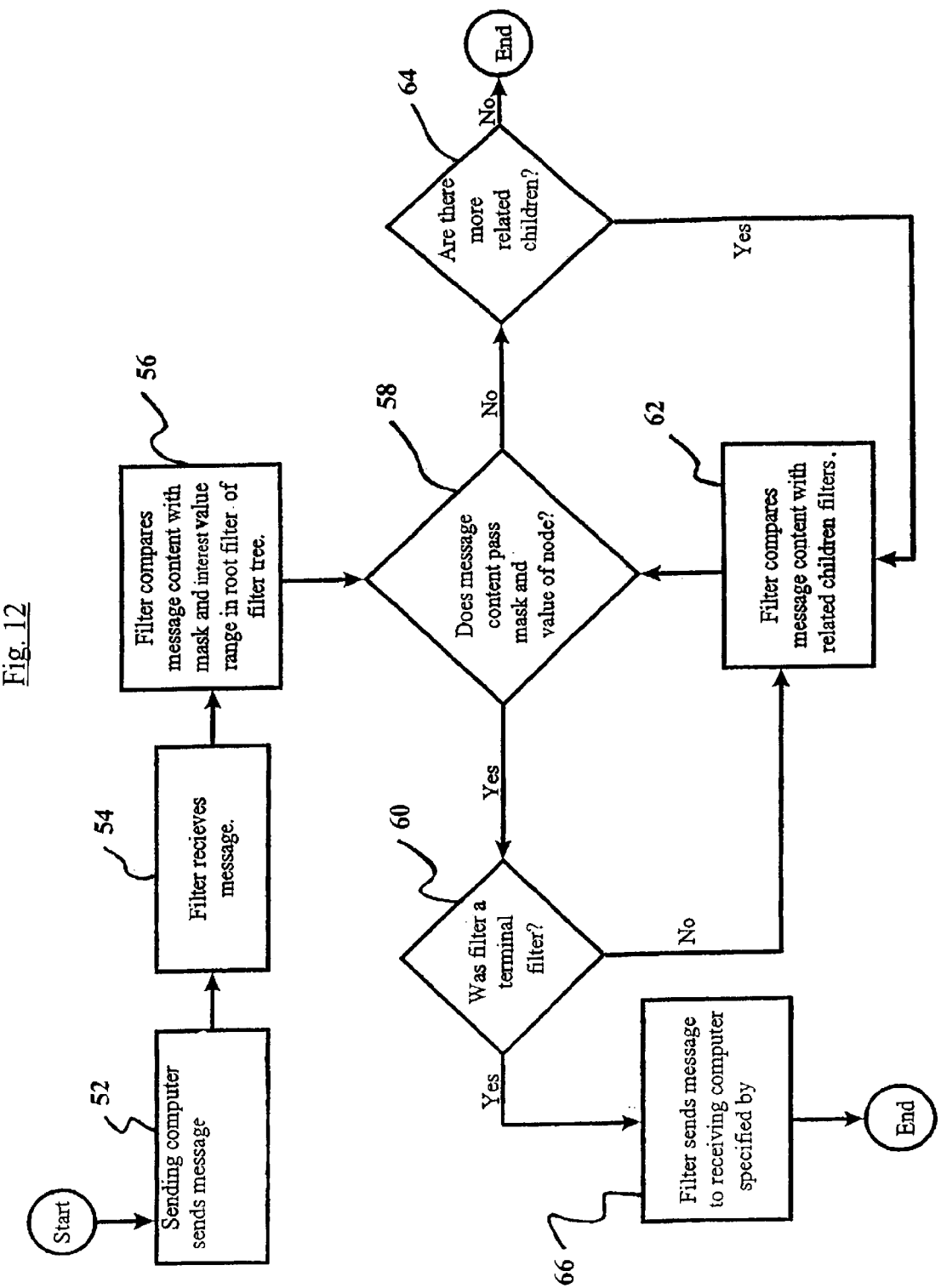

SYSTEMS AND METHODS FOR ROUTING MESSAGES SENT BETWEEN COMPUTER SYSTEMS

THE FIELD OF THE INVENTION

The present invention relates generally to the communication of electronic data between computer systems, and more specifically, to the filtering and routing of electronic messages communicated by computer systems.

BACKGROUND

In recent years there has been a great increase in the amount of computer technology that is involved in daily life. In today's world, computer technology is involved in many aspects of a person's day. Of course, much of the population works with desktop computers at home and/or at work. However, desktop computers are not the only items that utilize computer technology. Many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

The computers almost always have one or more processors at the heart of the computer. Typical desktop computers have input devices, such as a keyboard, a mouse, etc., and they also have output devices, such as a monitor, speakers, a printer, etc. The processor(s) usually are interconnected to different external inputs and outputs and function to manage the particular computer or device. For example, a processor in a vending machine for soda pop may be connected to the buttons used to select the pop, to the switch that allows a pop to drop down to a user, and to lights to indicate that the machine does not have any more pop of a particular variety.

Computer technology is involved in many aspects of today's world. Many appliances, devices, etc., include one or more small computers. For example, refrigerators, telephones, typewriters, automobiles, vending machines, and many different types of industrial equipment all have small computers, or processors, inside of them. Computer software runs the processors of these computers and tells the processors what to do to carry out certain tasks. For example, the computer software running on a processor in a vending machine may cause a soda pop to drop to a user when the correct change has been entered by a user.

With the expanding use of computer systems and the increasing number of devices and users that may be communicating using computer technology, large volumes of information are exchanged over computer networks between computers. For example, a computer may be used to relay messages between another computer, a printer, a monitor, a fax machine, a cellular phone, several different e-mail accounts, etc. Some systems can be large enough that millions of messages are being sent between the computers or devices connected to the system. Such a high volume of messages can slow down the processing ability of the system and utilize large amounts of memory.

It is desired that electronic communications be sent to interested computers and/or devices and to reduce the amount of unnecessary communications and to also reduce the amount of processing power required to achieve the communication.

BRIEF SUMMARY AND OBJECTS OF THE INFORMATION

In view of the foregoing, it is an object of the present invention to provide systems and methods for routing electronic messages that are sent between computer systems.

Consistent with the foregoing objects, and in accordance with the embodiments as embodied and broadly described herein, a method for routing input messages practiced in accordance with embodiments herein may include the steps of examining a plurality of interest data sets, each having a value that indicates specific data that is of interest, creating a filter tree from the plurality of interest data sets where each node of the filter tree accurately describes child nodes in such a way that input messages may be properly passed to any terminal nodes of the tree which have a value that describes the input messages, examining the input messages, comparing the input messages to the root node of the filter tree to determine if an input message should pass the root node, and, as long as the input message passes a current node, comparing the input message with the child nodes of the current node in order to effectively pass the input message to any terminal nodes of the tree having a value that describes the input message.

In an embodiment, an input message may be in the form of an electronic message sent by a computer system in electronic communication with a computer implementing the filter or routing method. Also, once the input message is passed to a terminal node with a value descriptive of the input message, the input message may be sent to a receiving computer system. Another embodiment of the invention may include interest data sets which also include a mask.

A computer system for routing electronic messages sent by sending computers in electronic communication with the system is disclosed as including a terminal node level. This level resides at level N. The terminal nodes include a mask and value which specify relevant portions of the input data and indicate a particular data value of interest, respectively. The system also includes a root node level residing at level one. The root node includes a mask and a range of values which specify relevant portions of the input message and indicate a range of values for desirable input data. Further included in the system are one or more intermediate levels residing at levels two to (N−1). These levels include nodes having a mask and a range of values describing desirable input messages. The levels of the system are interconnected in a tree structure such that input messages may be propagated down one or more branches of the tree structure to arrive at any terminal nodes of the tree having a value that describes the input message.

In an embodiment where the input message and interest data are embodied in binary formats, a parent node in any intermediate level is created by combining the masks and values of its child nodes in various logical processes such that the mask and range of values of the parent node accurately describes the values and masks of its child nodes.

BRIEF DESCRIPTION OF THE DRAWINGS

The foregoing and other objects and features of the present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 12 is a flow chart depicting a method of processing input messages through a filter tree of an embodiment.

DETAILED DESCRIPTION

Figure 1:
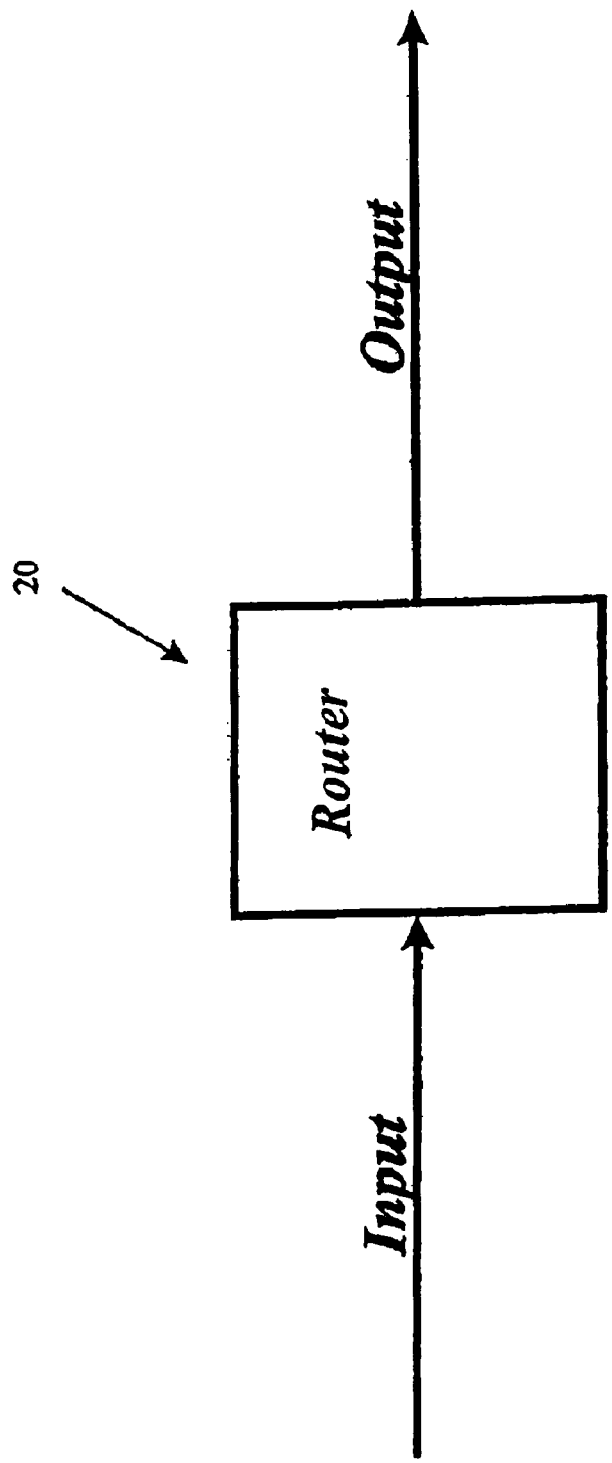
FIG. 1 is a block diagram illustrating the general process of an embodiment.

It will be readily understood that the components of the embodiments, as generally described and illustrated in the figures herein, could be arranged and designed in a wide variety of different configurations. Thus, the following more detailed description of the embodiments of the systems and methods disclosed, as represented in FIGS. 1 through 12, is not intended to limit the scope of the invention, as claimed, but is merely representative of the presently preferred embodiments.

The presently preferred embodiments will be best understood by reference to the drawings, wherein like parts are designated by like numerals throughout.

Generally, a method for routing messages may include the steps of examining a plurality of interest data sets, each having a value that indicates specific data that is of interest, creating a filter tree from the plurality of interest data sets where each node or filter of the filter tree accurately describes child nodes in such a way that input messages may be properly passed to any terminal nodes of the tree which have a value that describes the input message, examining the input message, comparing the input message to the root node of the filter tree to determine if the input message should pass the root node, and, as long as the input message passes a current node, comparing the input message with the child nodes of the current node in order to effectively pass the input message to any terminal nodes of the tree having a value that describes the input message.

In an embodiment, the input message may be in the form of an electronic message sent by a computer system in electronic communication with a computer implementing the routing method. Also, once the input message is passed to a terminal node with a value descriptive of the input message, the input message may be sent to a receiving computer system. Another embodiment of the invention may include interest data sets that also include a mask.

A computer system for routing electronic messages sent by sending computers in electronic communication with the system is disclosed as including a terminal node level. This level resides at level N. The terminal nodes include a mask and value which specify relevant portions of the input message and indicate a particular data value of interest, respectively. The system also includes a root node level residing at level one. The root node includes a mask and a range of values which specify relevant portions of the input data and indicate a range of values for desirable input data. Further included in the system are one or more intermediate levels residing at levels two to (N−1). These levels include nodes having a mask and a range of values describing desirable input messages. The levels of the system are interconnected in a tree structure such that input data may be propagated down one or more branches of the tree structure to arrive at any terminal nodes of the tree having a value that describes the input message.

In an embodiment where the input message and interest data are embodied in binary formats, a parent node in any intermediate level is created by combining the masks and values of its child nodes in various logical processes such that the mask and range of values of the parent node accurately describes the values and masks of its child nodes.

It will be appreciated by those skilled in the art that the systems and methods disclosed herein are implemented in computer software for execution by computer systems. Depending upon the particular implementation and need of the particular embodiment, the embodiments described herein may be developed for and implemented on a typical desktop computer, on an embedded system, distributed across a computer network, etc. Software engineers will appreciate that the present embodiments herein may be developed for and implemented on a wide variety of computer systems. Development tools, such as compilers, linkers, editors, simulators, emulators, etc., with which the present embodiments may be designed, coded and implemented are commercially available.

Referring to FIG. 1, the basic operation of an embodiment is such that input data is processed by a router 20 to produce output data. A router 20 receives input data, reads the data, and produces output data according to previously set requirements or parameters.

Figure 2:
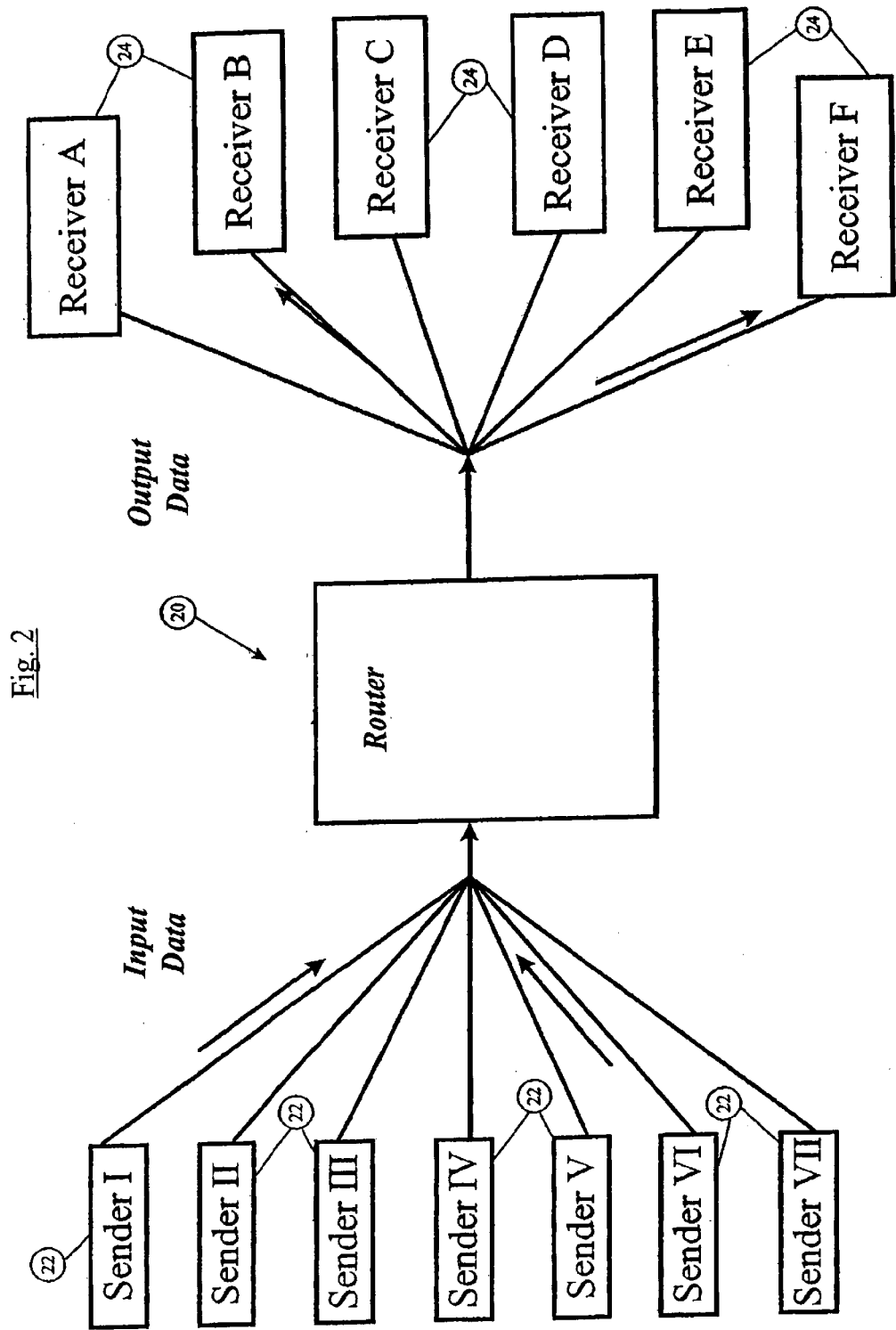
FIG. 2 is a block diagram of an embodiment illustrating multiple input messages and multiple output messages.

FIG. 2 shows a more specific embodiment where a plurality of sending computers 22 are electronically connected with a router 20. The sending computers 22 send messages to a plurality of receiving computers 24 through the router 20. The router 20 sorts the incoming messages 26 according to interest data 32 or criteria set by the plurality of receiving computers 24 and sends the messages to the receiving computers 24 accordingly.

Figure 3:
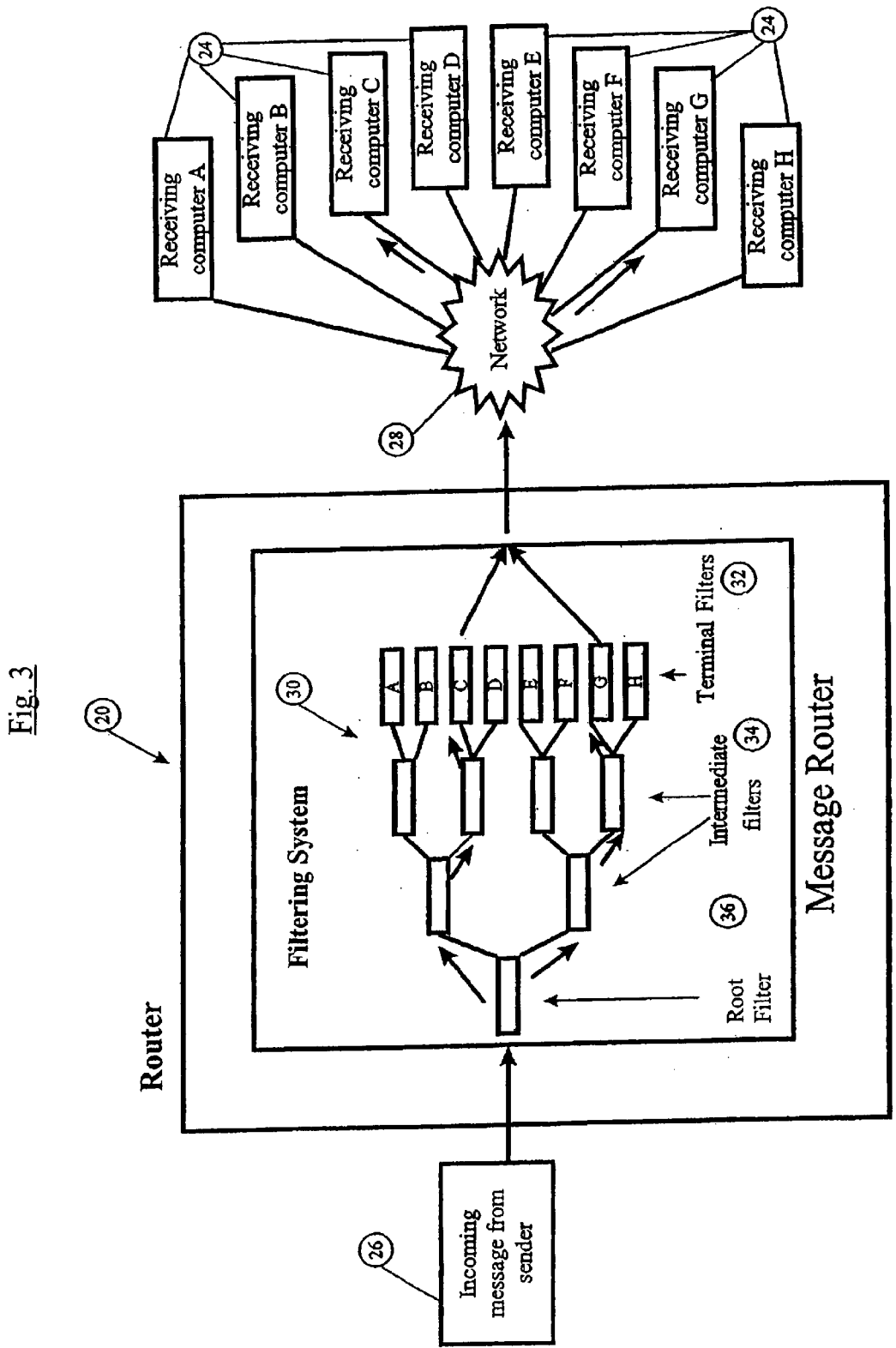
FIG. 3 is a more-detailed block diagram of an embodiment illustrating the use of a filter tree and a network.

To further illustrate, FIG. 3 shows an incoming message 26 being sorted by way of a filter tree 30 in order to direct the message to any receiving computers 24 that should properly receive the message. The filter tree 30 also prevents unwanted messages from being forwarded to various receiving computers 24. As is known in the art, trees used to filter or sort data are made typically made up of nodes. The components of the tree may be referred to herein as filters or nodes. The last elements of the filter tree 30 are terminal filters 32. These filters (or nodes) contain interest data 32*a*, 32*b* set by one or more receiving computers 24 or users. The interest data 32*a*, 32*b* defines the type of message and the relevant message content desired by a receiving computer 24. Messages that match the interest data 32*a*, 32*b* are sent to the receiving computers 24 identified by the particular terminal node 32.

Figure 4:
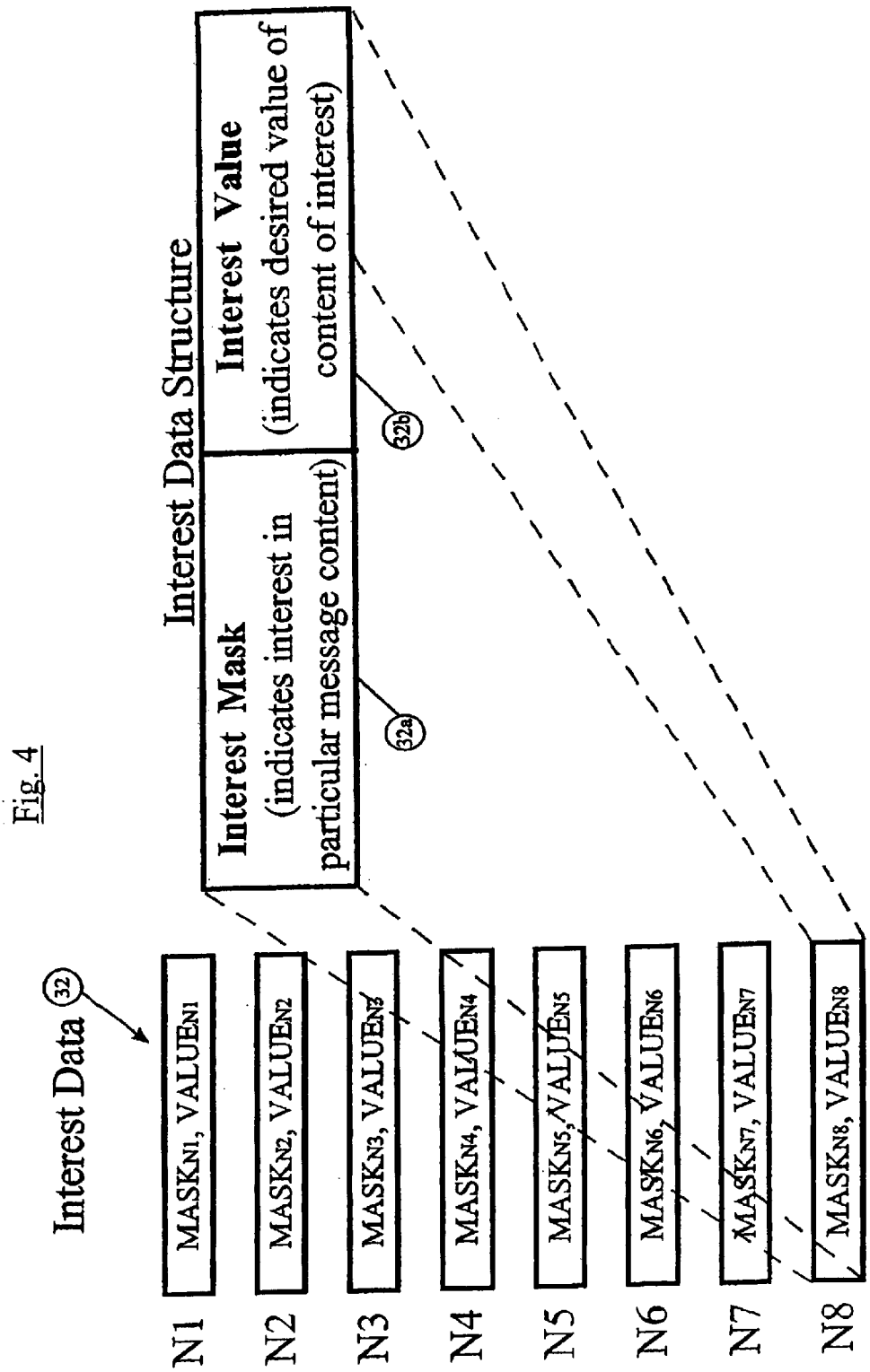
FIG. 4 is a data structure diagram illustrating the interest data structure of the terminal nodes of an embodiment.

Referring to FIG. 4, interest data 32*a*, 32*b* contained in the terminal filters or nodes 32 of an embodiment of a filter tree 30 may utilize a data structure made up of an interest mask 32a and an interest value 32b. This data is used to identify which messages should be sent to the specific receiving computers 24. Each receiving computer 24 specifies a mask 32a. The mask 32a indicates which portions of a message are of interest to a receiving computer 24 or to a user. Each receiving computer 24 or user also specifies an interest value 32b. The interest value 32b indicates what data must be present in the portions of interest before the message is sent to the receiving computer 24. Each receiving computer's 24 individual interest data 32a, 32b becomes a node or filter of the overall filter tree, or becomes associated with a node or filter of the tree. The original interest data sets 32a, 32b become the terminal filters 32 of the filter tree 30 as shown in FIGS. 3 and 5 through 10.

In an embodiment, the interest data 32a, 32b in the terminal filters are represented in binary form. Each terminal filter consists of a mask 32a and an interest value 32b. The mask 32a determines which data bits from the incoming message 26 will be used to determine how the message is processed and routed through the filter tree 30. The interest value 32b establishes the criteria necessary for a message 26 to pass the filter 20 and be sent to the corresponding receiving computers 24.

Figure 5:
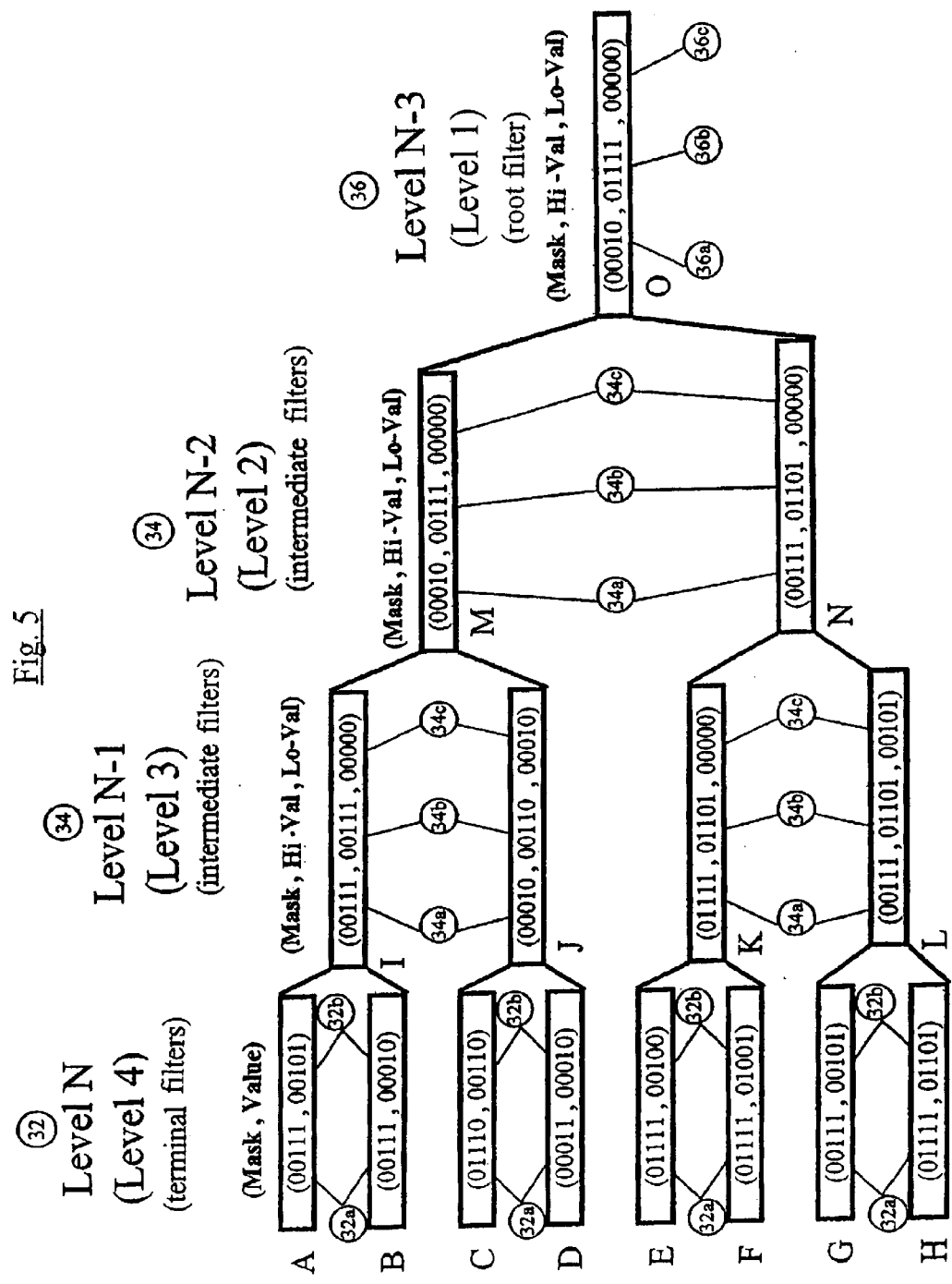
FIG. 5 is a block diagram illustrating the creation of a filter tree of an embodiment.

FIG. 5 illustrates a method for creating a filter tree 30 starting with the terminal filters 32 set at level N to create a root node 36 at level 1 and various intermediate nodes 34 at levels 2 through (N−1). A person skilled in the art will recognize that the data may be organized in various forms. This particular embodiment shows interest data 32a, 32b in binary form. Given a set of terminal filters 32, each consisting of individual mask 32a and interest value 32b data, the terminal filters 32 are divided into subsets of two or more. Each subset is combined to create a parent filter 34, 36 representing all the terminal filters 32 of that subset. For example, referring to FIG. 5, Level N represents the original terminal filters of a filter tree. In order to create the next level of the filter tree, Level N−1, the terminal filters A through H may be divided into groups of two. Nodes A and B combine to create node 1.

Creating the various levels and nodes of a filter tree 30 may be done in various ways. The only requirement is that each parent filter or node must accurately describe its child filters or nodes. For example, again referring to FIG. 5, filter M must accurately describe the requirements of filters I and J. Filter I must accurately describe the requirements of filters A and B, while filter J must accurately describe the requirements of filters C and D. Consequently, filter M describes the requirements of filters A, B, C, and D.

In one embodiment, the first step in creating a parent filter is to logically AND the masks 32a, 34a of the child filters to create the mask 34a, 36a of the parent filter. Next, the interest values 32b, 34b in the child filters are logically ORed together to create the upperbound interest value 34b, 36b of the parent filter. The interest values 32b, 34c in the child filters are then logically ANDed together to produce the lower-bound interest value 34c, 36c of the parent filter. For example, again referring to FIG. 5, filters A and B are combined to create filter I. The masks of filters A and B are ANDed together to produce the mask of filter I (i.e., 00111 AND 00111=00111). Next, the interest values of filters A and B are ORed together to produce the upper-bound interest value of filter I (i.e., 00101 OR 00010=00111). Finally, the interest values of nodes A and B are ANDed together to produce the lower-bound interest value of filter I (i.e., 00101 AND 00010=00000). This process is repeated to produce filters J though L.

Creating filters M and N is performed in a similar fashion. For filter M, the masks of filters I and J are ANDed together to produce the mask of filter M (i.e., 00111 AND 00010= 00010). The upper-bound interest values of filters I and J are ORed together to produce the upper-bound interest value of filter M (i.e., 00111 OR 00110=00111). The lower-bound interest values of filters I and J are ANDed together to produce the lower-bound interest value of filter M (i.e., 00000 AND 00010=00000). This process is repeated until a root filter is created (i.e., until only one node or filter exists in a single level of the tree as filter or node O in level 1).

Of course, it will be appreciated by those skilled in the art that the figures herein are examples of how the embodiments herein may be implemented and are not limiting of the claims. Accordingly, although the figures herein may depict a specific number of branches, child filters or nodes, levels, terminal filters, etc., it will be appreciated and understood by those skilled in the art that trees of virtually any size and configuration may be created and implemented to achieve an embodiment consistent with the principles herein.

Figure 6:
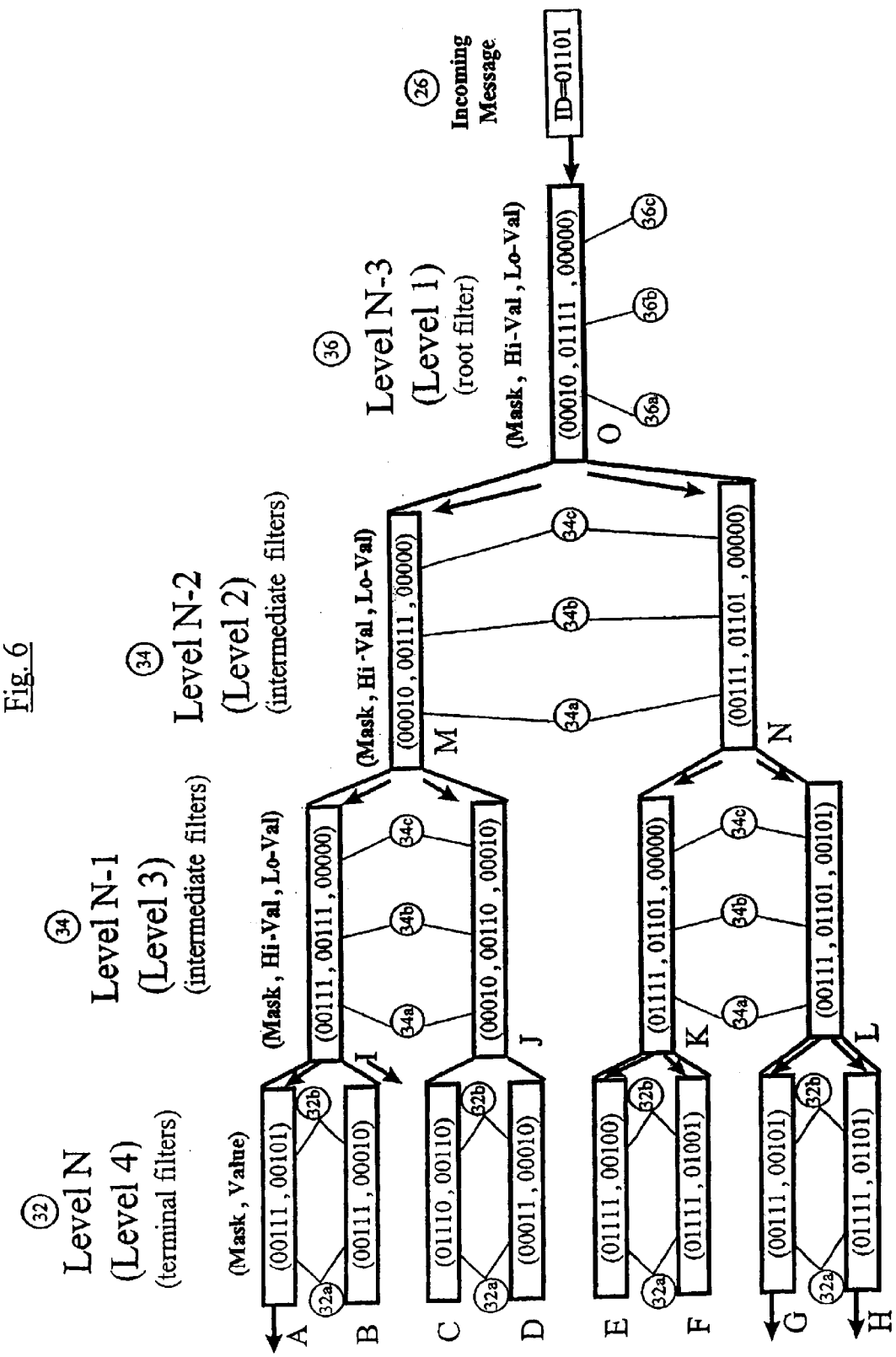
FIG. 6 is a block diagram illustrating a method of processing input messages through a filter tree of an embodiment.

Referring to FIG. 6, an embodiment of processing an incoming message 26 through a filter tree 30 includes successively comparing an incoming message 26 to the filters or nodes of the filter tree 30. A person skilled in the art will recognize that a message may pass through a filter in various ways as long as the message is routed to the proper receiving computer 24 according to the interest data 32a, 32b specified in the terminal filters 32. In the embodiment shown in FIG. 6, a terminal filter 32 with an interest value 32b that accurately describes the input data of an incoming message 26 will pass the message 26 to the corresponding receiving computers 24.

According to the embodiment illustrated in FIG. 6, an incoming message 26 is sent containing input data ("ID") in the message. The input data 26 is compared to the root filter 36 of the filter. If the input data 26 is within the requirements of the root filter 36, the message 26 passes the root filter 36 and is compared to the child filters of the root filter.

For example, referring to FIG. 6, if an incoming message 26 passes filter O, it is then compared to filters M and N. If the message passes filter M 34, it is then compared to its child filters, filters I and J. This process continues until a message can no longer pass any filters, or the message is passed by one or more terminal filters 32 and sent to the corresponding receiving computers 24.

FIG. 6 also illustrates an embodiment of the process of comparing input data 26 to a filter. Initially, the input data 26 is logically ANDed with the mask 32a, 36a of the filter. The masked result is then compared to the upper-bound and lower-bound interest values 34b, 34c, 36b, 36c. If the masked result lies within the range defined by the upper-bound and lowerbound interest values 34b, 34c, 36b, 36c, the message passes the filter and moves on to the child filters. If the masked result does not lie within this range, the message does not pass the filter and proceeds to be compared to remaining filters in the same level, if any. If the message is not passed through a terminal filter 32, the message is not sent to any receiving computer 24. Sending and receiving electronic messages via communication networks is well known in the art, and, accordingly, those skilled in the art will appreciate how to send an electronic message to a receiving computer via a computer network.

Referring to an embodiment illustrated in FIG. 6, a message is sent with input data of 01101 as shown in FIG. 6. This input data 26 is ANDed with the mask of filter O (i.e., 01101 AND 00010=00000). The masked result is then compared to the upper-bound and lower-bound interest values. Because the masked result of 00000 is within the range defined by the upper-bound and lower-bound interest values of filter O (i.e. 01111>00000≧00000), the message passes filter O and continues to filters M and N. The same process is used to compare the message input data 26 to the higher level filters 32, 34 until the message input data cannot pass further, or is passed by one or more terminal filters 32 and sent to the corresponding receiving computers 24.

Figure 7:
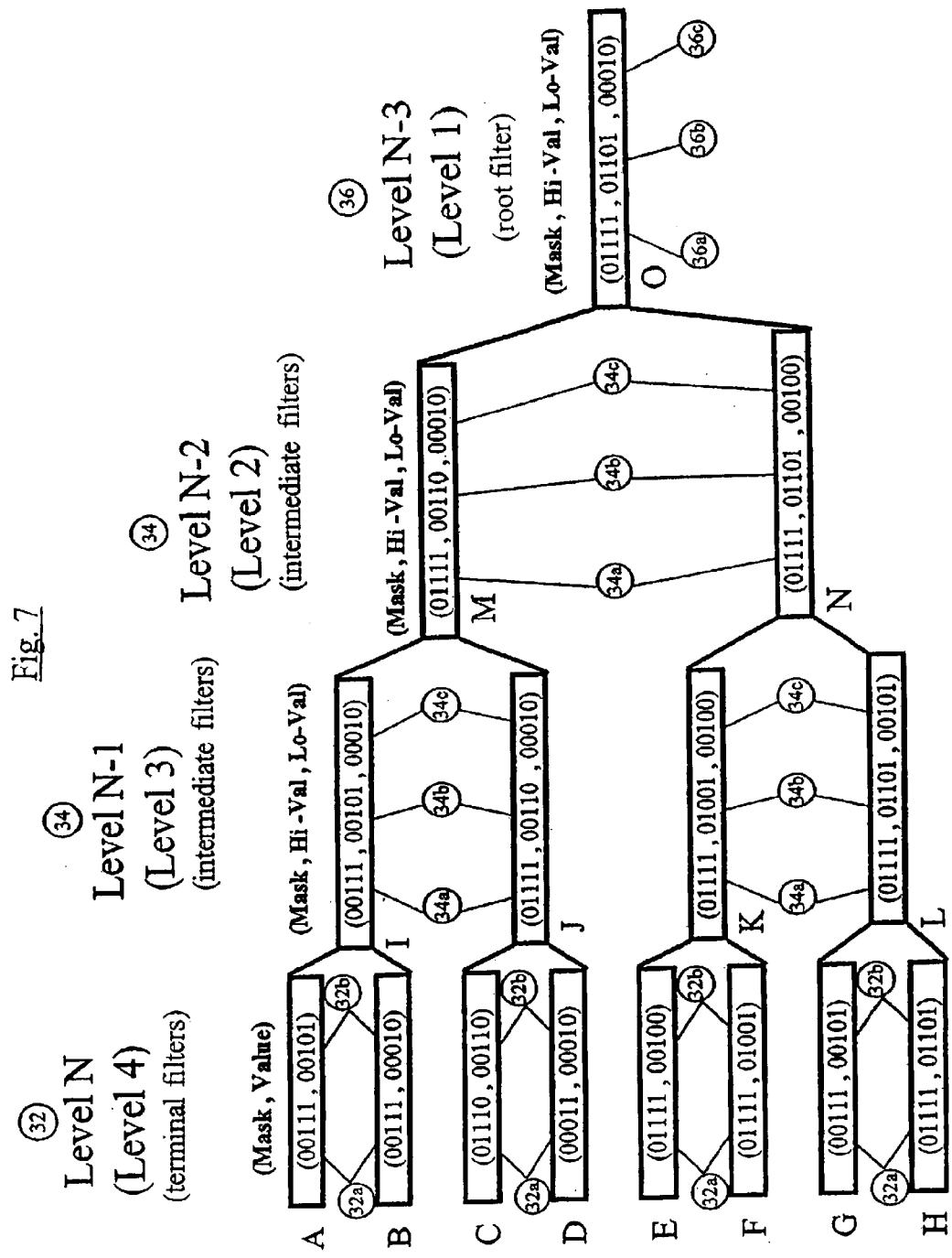
FIG. 7 is a block diagram illustrating an alternate method of creating a filter tree of an embodiment.

FIG. 7 illustrates an example of an alternate method for constructing a filter tree 30 from the same terminal filters 32 used in the example in FIG. 5. To create a parent filter using this alternate method, the masks 32a, 34a in the child filters are ORed together to produce the mask 34a, 36a of the parent filter. The interest values 32b or ranges 34b, 34c in the child filters are then compared and sorted. The greatest interest value or greatest range value is used as the upper-bound interest value 34b, 36b of the parent filter and the smallest interest value or smallest range value is used as the lower-bound interest value 34c, 36c of the parent filter.

For example, referring to FIG. 7, the masks of filters C and D are ORed together to produce the mask of filter J (i.e., 01110 OR 00011=01111). Next, the greater of the two interest values for filters C and D is used as the upper-bound interest value of filter J (i.e., 00110>00010; upper-bound=00110). Finally, the lesser interest value of filters C and D is used as the lower-bound interest value for filter J (i.e., 00010<00110; lower-bound=00010). This process is repeated until a root filter is created (i.e., until only one filter exists in a single level of the tree as filter O in level 1).

For an additional example, also referring to FIG. 7, filters M and N are combined to produce filter O. The masks of filters M and N are ORed together to produce the mask of filter O (i.e., 01111 OR 01111=01111). The greatest of the upper-bound interest values of filters M and N is used as the upper-bound interest value of filter O (i.e., 01101>00110; upper-bound=01101). The lesser of the lower-bound interest values is used as the lowerbound interest value of filter O (i.e., 00010<00100; lower-bound=00010). Because filter O is the only filter of level N–3, the filter tree is complete.

Figure 8:
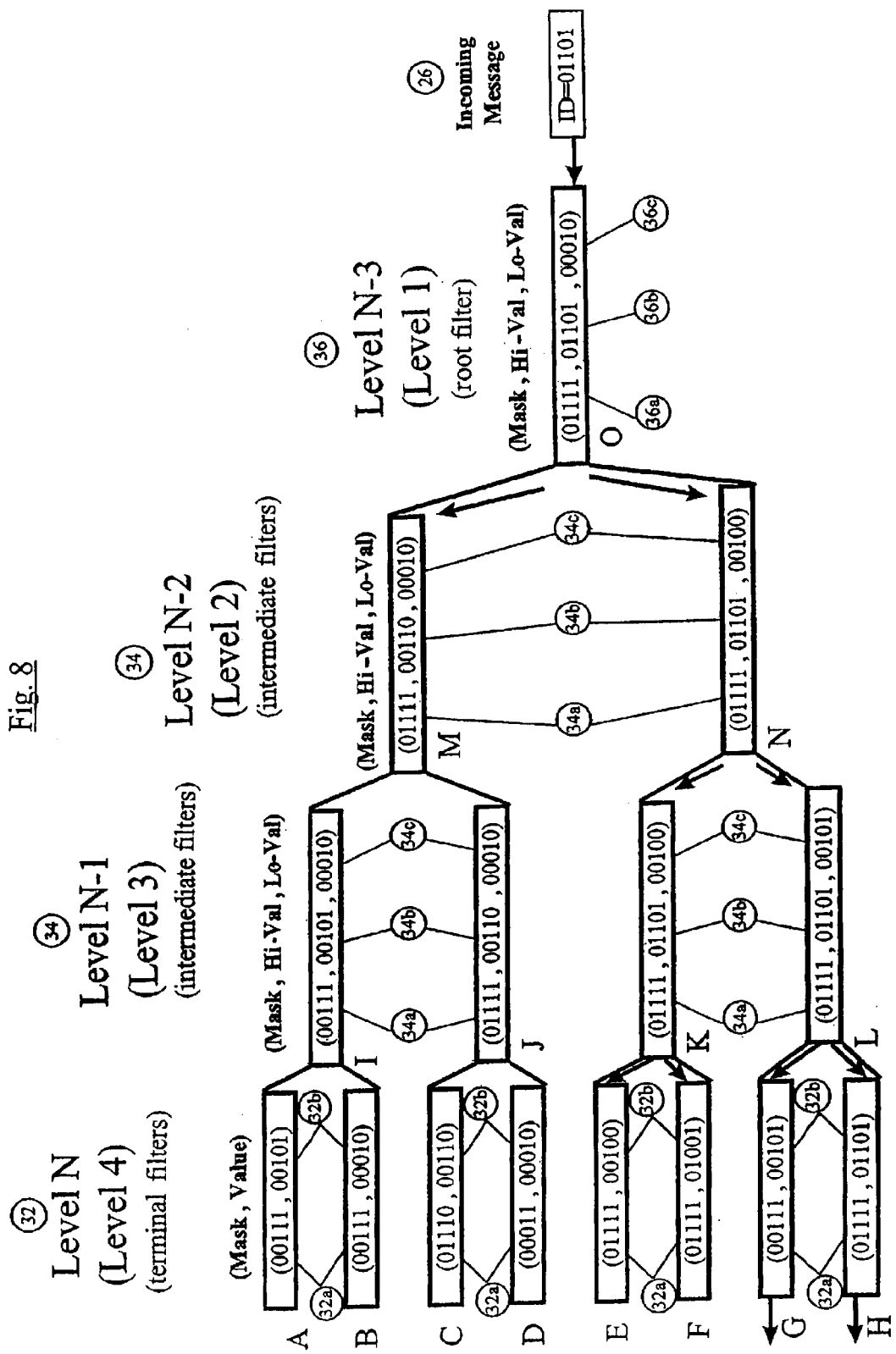
FIG. 8 is a block diagram illustrating an alternate method of processing input messages through a filter tree of an embodiment.

Referring to FIG. 8, an incoming message 26 with input data may be processed through the filter tree 30 created in the example in FIG. 7. The comparison and passing of the input data is performed similar to the comparison and passing described in accordance with FIG. 6. After the input data 26 is ANDed with the mask 32a, 34a, 36a of the filter, the masked result is compared to the range described by the upper-bound and lower-bound interest values 34b, 34c, 36b, 36c. If the masked result is within the range, the message passes the filter.

Again referring to FIG. 8, the input data is ANDed with the mask of filter O to produce a masked result (i.e., 01101 AND 01111=01101). The masked result is then compared to the range described by the upper-bound and lower-bound interest values. Because the masked result falls within the range, the message passes filter O (i.e., 01101<01101>00010). This process is continued until the input data 26 can no longer pass a filter, or until the message passes one or more terminal filters 32 and is sent to one or more corresponding receiving computers 24.

Figure 9:
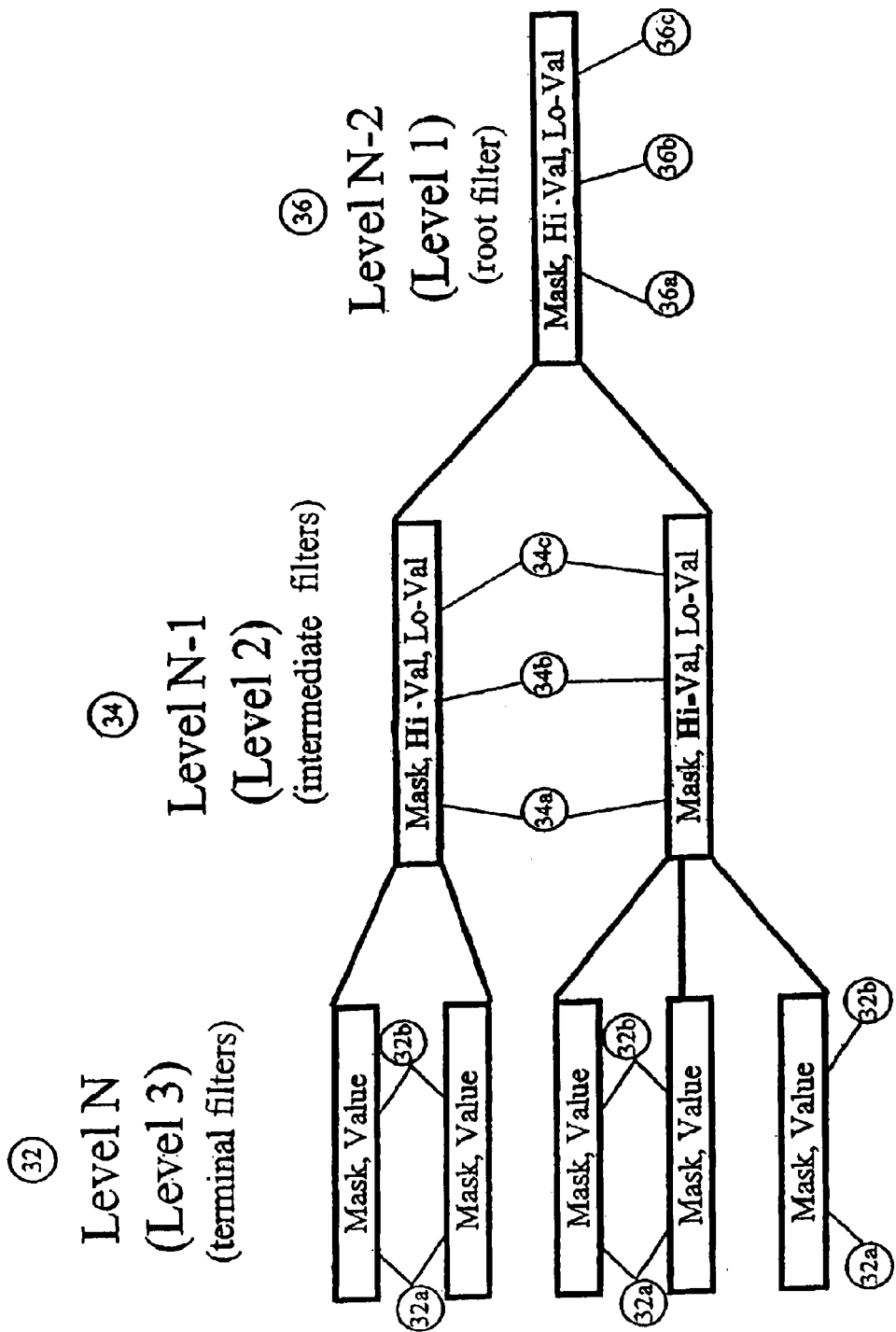
FIG. 9 is a block diagram illustrating the creation of a non-symmetrical filter tree of an embodiment.
Figure 10:
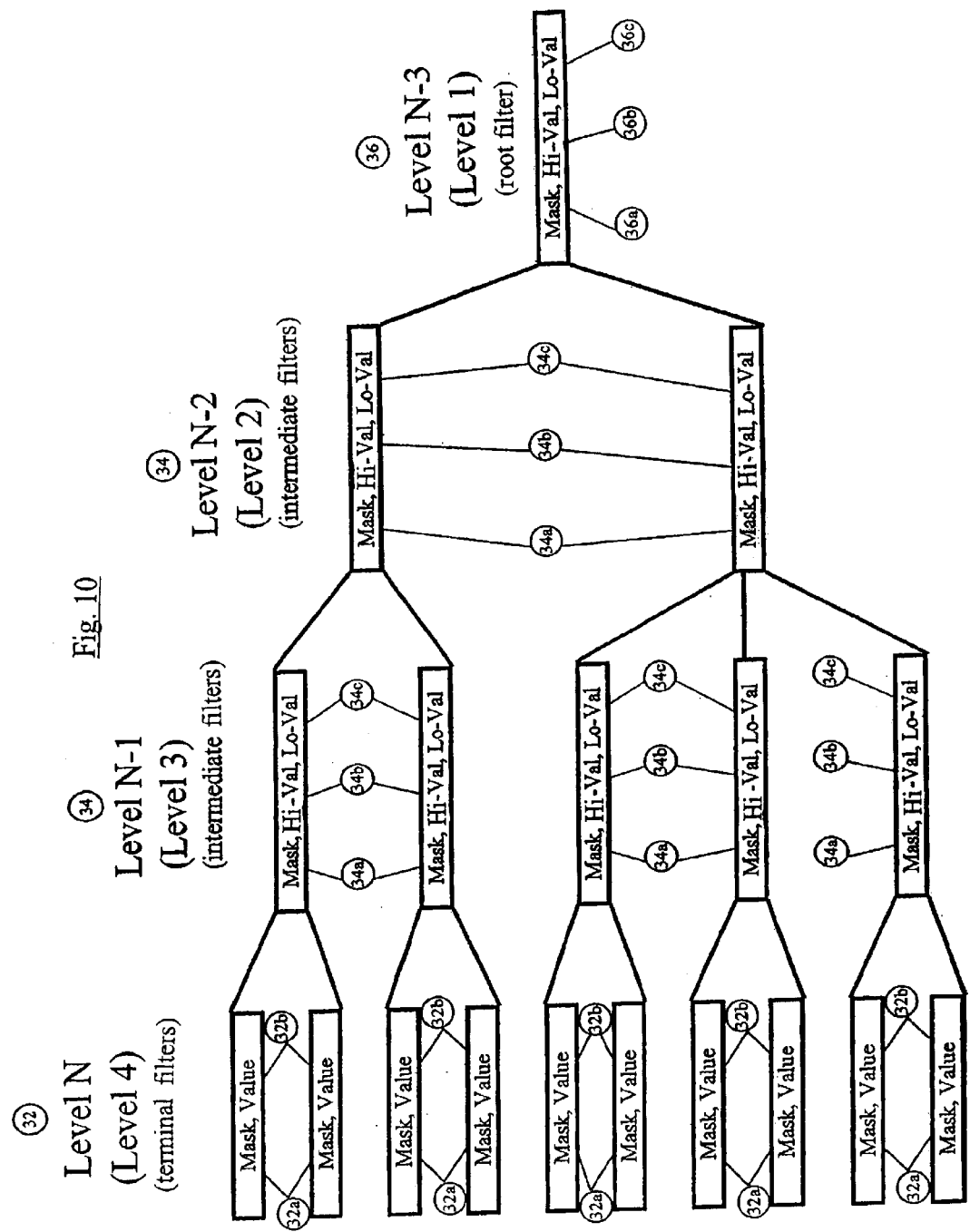
FIG. 10 is a block diagram illustrating the creation of a non-symmetrical filter tree of an embodiment.

FIGS. 9 and 10 illustrate, generally, the structure of a filter where the number of terminal filters 32 does not provide the base for a symmetrical tree. Referring to FIG. 9, a filter in level two 34 is created by combining three terminal filters 32. Referring to FIG. 10, the terminal filters 32 divide evenly into subsets of two. However, a filter in level two 34 is created by combining three filters in level three 34.

Figure 11:
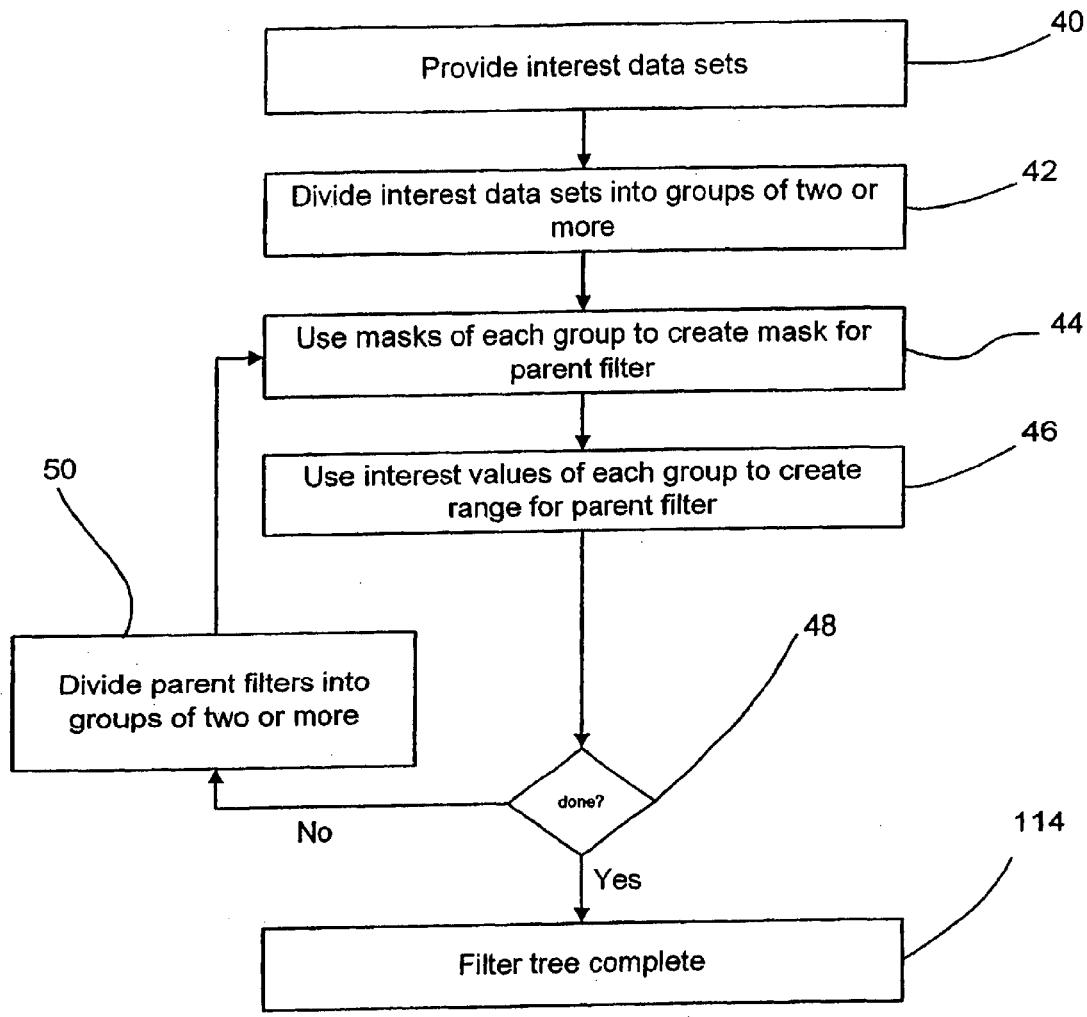
FIG. 11 is a flow chart depicting a method of creating a filter tree of an embodiment.

Referring to FIG. 11, an embodiment of a filter tree may be created by performing the steps shown in the flow chart. The flow chart illustrates the process of creating a filter tree as explained in FIGS. 5, 7, 9 and 10. Receiving computers 24 or users wishing to have particular messages sent to them first provide 40 one or more interest data sets to the implementers of the filtering embodiment. The interest data sets are then divided 42 into groups of two or more filters, as explained earlier. Parent nodes (or filters) may then be created by using 44 the masks of each group, as explained herein, to create a parent filter mask and by using 46 the interest values of each group to create a range of interest values for the parent, as explained earlier.

Once parent filters or nodes have been created for the child filters, one determines 48 whether there is more than one parent filter in the new level. If there is more than one parent 1 filter, then in certain embodiments herein, another level of filters is to be created. The current level of filters is divided 50 into groups of two or more filters. Then steps 44 and 46 are followed to create the next level of parent filters.

Referring to FIG. 12, input messages traverse a filter tree utilizing the steps described in the flow chart. The flow chart illustrates the method of processing an incoming message through the nodes of a filter tree as explained in FIGS. 6 and 8. A sending computer sends 52 an electronic message. The filter receives 54 the message. As described herein, the filter then compares 56 the message, or a part of the message, with the root filter of the filter tree. Embodiments herein then determine 58 whether the message content should pass the root filter. If the message passes the root filter, embodiments then determine 60 whether the filter was a terminal filter. If the filter was not a terminal filter, the message is compared 62 with the child filters. After the comparison 62, the system can determine 58 whether the message should pass the filter or node. If the message does not pass the filter or node, embodiments determine 64 whether there are more child filters to compare with. If there are no more child filters and the message did not pass the current node, the filtering process filtered out the message such that it is not sent on to a user and or a receiving computer 24. If the message does pass a filter, and the filter was determined 60 to be a terminal filter, the system then sends 66 the message on to a receiving computer 24 or to a user who so requested the message.

From the above discussion, it will be appreciated that the present embodiments disclosed provide systems and methods for routing electronic data that is being sent between computer systems.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for routing messages comprising:
examining a plurality of interest data sets, wherein each interest data set comprises a value, and wherein each value indicates data that is of interest;
creating a filter tree from the plurality of interest data sets wherein each node of the filter tree accurately describes child nodes such that the messages are properly passed to any terminal nodes of the tree having a value that describes the messages;
examining the messages; and comparing the messages to the root node of the filter tree to determine if the messages should pass the root node, and, as long as a message passes a current node, then comparing the message with the child nodes of the current node in order to effectively pass the message to any terminal nodes of the tree having a value that describes the message.

2. The method as defined in claim 1 wherein the messages comprise electronic messages sent by computer systems in electronic communication with a computer implementing the method for filtering.

3. The method as defined in claim 1 wherein the messages that are passed to a terminal node having a value descriptive of the messages are sent electronically to one or more receiving computer systems.

4. The method as defined in claim 1 wherein the interest data sets further comprise a mask.

5. In a system for computers, where electronic messages are sent by sending computers and are received by receiving computers, a method for routing the electronic messages comprising the steps of:
   acquiring a plurality of interest data sets, wherein each interest data set comprises a value and a mask;
   creating a filter tree from the plurality of interest data sets wherein each parent node of the filter tree accurately describes child nodes such that an input electronic message is properly passed to any terminal nodes of the tree having a value that describes the input electronic message;
   receiving the input electronic message sent by a sending computer;
   comparing the input electronic message to traversed nodes of the filter tree in succession in order to effectively pass the input electronic message to any terminal nodes of the tree having a value that identifies the electronic message; and
   sending the input electronic message to a receiving computer if the input electronic message passed through the filter tree without being blocked.

6. The method of claim 5 wherein the mask specifies message content that is relevant, and where the value indicates a specified value that is to be present in the specified content such that the input electronic message is sent to one or more receiving computers.

7. The method of claim 6 wherein the creating step further comprises:
   dividing the interest data sets into groups of two or more nodes;
   using the mask and the value of the nodes in each group to create a parent mask and a parent value range for a parent node in the adjacent level of the tree such that the parent mask and the parent value range of the created patent node accurately describe the mask and the value of each node in the group used to create the parent node; and
   repeating the dividing step and the using step until only one parent node exists in one level of the tree.

8. The method of claim 7 wherein the mask and interest value are in binary form.

9. The method of claim 8 wherein the using step further comprises the steps of:
   logically ANDing the masks of the nodes in each group to produce the parent mask;
   logically ORing the values of the nodes in each group to produce an upper-bound value for the parent value range; and
   logically ANDing the interest values of the nodes in each group to produce a lower-bound value for the parent value range.

10. The method of claim 8 wherein the using step further comprises the steps of:
    logically ORing the masks of the nodes in each group to produce the parent mask;
    selecting the highest value of the values of each group to be an upper-bound value for the parent value range; and
    selecting the lowest value of the values of each group to be a lower-bound value for the parent value range.

11. The method of claim 8 wherein the comparing step further comprises the steps of:
    logically ANDing the electronic message with the mask of the node to produce a masked result;
    determining whether the masked result exists within the parent value range of the node;
    allowing the electronic message to pass the node if the masked result exists within the parent value range; and
    repeating the logically ANDing, the determining and the allowing steps until the electronic message can no longer be passed by a parent node or the electronic message is passed by one or more terminal filter nodes.

12. A system for filtering electronic messages, wherein the electronic messages are sent by sending computers in electronic communication with the system, the system comprising:
    a terminal node level, residing at level N, wherein each terminal node comprises a mask and value, the mask specifying the relevant portions of the messages, and the value indicating a particular data value that is of interest;
    a root node level, residing at level one, wherein the root node comprises a mask and a range, the mask specifying the relevant portions of the messages, and the range indicating a range of values for desirable messages; and
    one or more intermediate levels, residing at levels two to (N−1), wherein each intermediate level comprises one or more nodes, and wherein each intermediate node comprises a mask and a range; and wherein the levels are interconnected in a tree structure such that messages may be propagated down one or more branches of the tree structure to arrive at any terminal nodes of the tree having a value that describes the messages.

13. The system of claim 12 wherein a parent node is created by a method comprised of the steps of:
    logically ANDing the masks of child nodes to produce a parent mask;
    logically ORing the values of the child nodes to produce an upper-bound value for a parent range; and
    logically ANDing the values of the child nodes to produce a lower-bound value for the parent range.

14. The system of claim 13 wherein an input electronic message is filtered by the system through a method comprises of the steps of, beginning with the root node:
    logically ANDing the electronic message with the mask of the node to produce a masked result;
    determining whether the masked result exists within the parent range of the node;
    allowing the electronic message to pass the node if the masked result exists within the parent range; and
    repeating the logically ANDing, the determining and the allowing steps until the electronic message can no longer be passed by a parent node or the electronic message is passed by one or more terminal filter nodes.

15. The system of claim 12 wherein a parent node is created by a method comprised of the steps of:

logically ORing the masks of child nodes to produce a parent mask;

selecting the highest value of the values of the child nodes to be an upper-bound value for a parent range; and selecting the lowest value of the values of the child nodes to be a lower-bound value for the parent range.

16. The system of claim 15 wherein an input electronic message is filtered by the system through a method comprises of the steps of, beginning with the root node:

logically ANDing the electronic message with the mask of the node to produce a masked result;

determining whether the masked result exists within the parent range of the node;

allowing the electronic message to pass the node if the masked result exists within the parent range; and repeating the logically ANDing, the determining and the allowing steps until the electronic message can no longer be passed by a parent node or the electronic message is passed by one or more terminal filter nodes.

* * * * *